United States Patent
Berggren et al.

[11] Patent Number: 6,005,707
[45] Date of Patent: Dec. 21, 1999

[54] OPTICAL DEVICES COMPRISING POLYMER-DISPERSED CRYSTALLINE MATERIALS

[75] Inventors: Magnus Rolf Berggren, Linkoping, Sweden; Ananth Dodabalapur, Millington; Michael Louis Steigerwald, Martinsville, both of N.J.

[73] Assignee: Lucent Technologies Inc., Murray Hill, N.J.

[21] Appl. No.: 08/976,002

[22] Filed: Nov. 21, 1997

[51] Int. Cl.[6] .................. G02F 1/35; G02B 6/90; C09K 19/12
[52] U.S. Cl. ............... 359/322; 359/248; 359/298; 359/320
[58] Field of Search .................. 359/248, 298, 359/315, 320, 322

[56] References Cited

U.S. PATENT DOCUMENTS

| | | | |
|---|---|---|---|
| 5,518,654 | 5/1996 | Cates | 252/299.66 |
| 5,559,057 | 9/1996 | Goldstein | 437/228 |
| 5,751,018 | 5/1998 | Alivisatos et al. | 257/64 |
| 5,759,634 | 6/1998 | Zang | 427/446 |

FOREIGN PATENT DOCUMENTS 10186426  7/1998  Japan .

OTHER PUBLICATIONS

Akinow et al, Optika in Spekt. vol. 72, #4, pp. 1026–1032, abst. only herewith, Apr. 1992.
Bawendi et al, Physical Review Letters, vol. 65, #13, pp. 162–1626; abst. only herewith, Sep. 24, 1990.
Woggon U et al. "Electro–Optic Properties of CdS Embedded in a Polymer", Physical Review B (Condensed Matter), Oct. 15, 1993, USA, vol. 48, No. 16, pp. 11979–11986.
Salata O V et al. "Uniform GaAs Quatnum dots in a Polymer Matrix", Applied Physics Letters, Jul. 11, 1994, USA, vol. 65, No. 2, pp. 189–191.

*Primary Examiner*—Nelson Moskowitz

[57] ABSTRACT

Optical modulators and switches for use in telecommunications systems are disclosed having solid-state crystalline optical material comprised of III–V, II–VI, and IV semiconductor nanocrystals embedded in a polymer matrix. In a preferred embodiment, the crystalline material comprises CdSe crystals sized at less than 5.8 nm in diameter and more preferably at less than about 4 nm in diameter and advantageously embedded in poly(vinyl pyridine). The crystalline material sandwiched between two electrodes defines an optical modulator. In one preferred embodiment, the crystalline material with ten-percent crystal embedded in a polymer will exhibit with an applied voltage of 100V, a differential absorbance spectra ($\Delta A$) of about 50 $cm^{-1}$ at wavelengths of about 610 nm and a differential refractive index ($\Delta n$) of about $10^{-4}$ at wavelengths of about 625 nm.

14 Claims, 4 Drawing Sheets

1

OPTICAL DEVICES COMPRISING POLYMER-DISPERSED CRYSTALLINE MATERIALS

FIELD OF THE INVENTION

The invention relates to optical modulators and switches for use in telecommunications systems comprising solid-state crystalline optical material disposed between electrodes and, in particular, to such modulators wherein the crystalline material is comprised of III–V, II–VI or IV semiconductor nanocrystals embedded in a polymer matrix. The invention further relates to a method for making the optical crystalline material.

BACKGROUND OF THE INVENTION

Integrated circuits are being fabricated in smaller sizes and with electronic circuitry operable at increasingly higher speeds. As the operative speed of electronic circuits increases, it is becoming increasingly more difficult to transmit electrical signals between integrated circuits and boards. For this reason, there is growing interest in developing faster optical interconnect technologies that are operable at high frequencies and compatible with the silicon technology used in integrated circuits.

Crystalline materials are useful in fabricating optical modulators. Crystals have structures existing in a particular orientated arrangement with molecules aligned relative to each other. Upon an applied electric field, the refractive index, absorbance, or other optical properties of crystalline materials may change to a degree commensurate with the applied field. These changes are used to modify the phase, intensity, irradiance, or other properties of a beam of light propagated through a crystalline medium. Referring to FIG. 1A, for example, an optical communication device 10 may comprise a crystal unit 12 sandwiched between first and second electrodes 14, 16, with a power source 15 coupled to the electrodes. Power is applied to the electrodes 14, 16, and a laser 20 is activated to emit a laser beam following the arrow L in FIG. 1A. The laser may be a semiconductor laser, a HeNe laser (632 nm) or the like. The crystal unit 12 is influenced by the applied electric field, and the intensity or phase of the light passing through the crystal unit is changed. As shown in FIG. 1B, the modulator may be coupled to a detector 18 for receiving the light and detecting the variation in the polarization of the light beam to define an optical communication system. Thus, changes in absorption spectra of the crystals with applied fields can be used in the manipulation of light for the presentation, manipulation, and transfer of information, and in the production of efficient optical communication systems.

For use in electro-optic modulators, it has been considered desirable to have good quality crystals available at modest cost. Also, in optimizing the efficacy of a light modulator, it is desirable to keep the absorbance low at the operating wavelength (to minimize waveguide loss), and to maximize the change in optical properties with the applied field. A higher peak differential absorbance (for modulators based on electroabsorption) or peak differential refractive index change (for modulators based on electrorefraction) will translate to a smaller device length sufficient for modulation. The thickness or length of the crystal unit may also affect the degree of modulation. Thus, a higher differential will mean a smaller capacitance and hence higher speeds. A higher differential can also mean lower operating voltages (and hence power). It is desirable in achieving these goals to select appropriate crystalline materials and synthesis procedures that yield monodisperse or nearly monodisperse particles (i.e., nanoparticles possessing a uniform size).

Presently, potassium dihydrogen phosphate (KDP) and aluminum dihydrogen phosphate (ADP) crystals are well known for use in optical modulators. Although such crystals are available in large sizes at relatively low cost, they are soluble in water, fragile, and have large half-wave voltages (that is, large voltages are required for maximum transmission). Lithium tantalate and lithium niobate are more effective and may be used for extremely high frequency products, but their compatability with silicon technology has not yet been satisfactorily demonstrated, and they are also expensive and have a high rejection rate in fabrication. Single-crystal cadmium telluride and gallium arsenide optical materials are well known, but they typically have not been operable at extremely high frequencies. Also, integration with Si-based circuits could be problematic.

Electro-optical modulators also have been described using crystal units comprising organic liquid crystals dispersed in a polymeric material, as shown in U.S. Pat. No. 5,132,814, to Ohkouchi et al, entitled "Liquid Crystal Spatial Light Modulator with Multi-layer Photoconductor," and U.S. Pat. No. 5,011,624, to Yamagishi et al., entitled "Acryate PolymerDispersed Liquid Crystal Material and Device Made Therefrom." Although encapsulated or polymeric-dispersed organic liquid crystal units have advantages, it is difficult to control liquid crystal composites during preparation. Often, liquid crystal droplets have irregular sizes and shapes such that the crystalline material may vary from region to region in its response to the applied electric field. Additionally, organic liquid crystals are generally temperature-sensitive and thermally instable, and the crystalline material may form a clear liquid at increased temperatures. Furthermore, such modulators typically do not operate at the high speeds desired for optical data transmission applications. Nanocrystal-polymer composites have been explored for applications other than optical modulators, that is, for use in light emitting diodes and photoconductors where for most purposes a fast response tme is not essential. See Alivisatos, "*Semiconductor Clusters, Nanocrystals, and Quantum Dots,*" SCIENCE, Vol. 271 (Feb. 16, 1996), at pp. 933–36, which is hereby incorporated by reference.

Accordingly, there remains a need for improved semiconductor crystalline materials useful in electro-optical modulators. Efforts have been made to improve synthesis procedures to obtain nearly monodisperse particles, as disclosed in C. B. Murray, et als., "*Synthesis and Characterization of Nearly Monodisperse CdE (E=S, Se, Te), Semiconductor Nanocrystallites,*" J. AM. CHEM. Soc. Vol. 115, No. 19, pp. 8706–8715 (1993), which is incorporated herein by reference. As noted in Murray, et als., difficulties inhere in the synthesis of II–VI semiconductor crystallites due to polydispersities in size and shape, and due to surface defects and imperfections.

The present invention provides improved crystalline materials exhibiting high peak differential absorbance and refractive index changes that may be used in electro-optical modulators operable at high frequencies and at a broad range of wavelengths. Further features, characteristics, and advantages may appear more fully upon consideration of the detailed description given below.

SUMMARY OF THE INVENTION

Applicants have discovered that embedding a crystalline material comprising III–V, II–VI, or IV semiconductor nanocrystals in a polymer material provides an optical material exhibiting a high peak differential absorbance or peak differential refractive index that is useful for modulators based on either electroabsorption or electrorefraction and may be integrated with silicon-based circuits. In a preferred embodiment, the crystalline material comprises CdSe crystals sized at less than 5.8 nm in diameter and more preferably at less than about 4 nm in diameter and advantageously embedded in poly(vinyl pyridine). The crystalline material sandwiched between two electrodes defines an optical modulator. The crystalline material with ten-percent crystal embedded in a polymer exhibits with an applied voltage of 0.5 to 100V, a differential absorbance spectra ($\Delta A$) of about 5 to 300 cm$^{-1}$ at wavelengths of about 600 nm to 650 nm and a differential refractive index ($\Delta n$) of about $10^{-5}$ to $10^{-3}$. The crystalline material may be made by dissolving the crystals in a monomer followed with polymerization to provide a resultant polymer-nanocrystal matrix.

BRIEF DESCRIPTION OF THE DRAWINGS

For a better understanding of the invention, an exemplary embodiment is described below, considered together with the accompanying drawings, in which.

It is to be understood that these drawings are for the purposes of illustrating the concepts of the invention and except for the graphs are not to scale.

DETAILED DESCRIPTION OF THE INVENTION

Applicants have discovered that III–V, II–VI or IV semiconductor nanocrystals may be synthesized that are substantially monodisperse and embedded in a polymer material to provide active materials for use in optical devices that exhibit distinct excitonic absorption features at room temperature. In a preferred embodiment, the crystalline material comprises about 4nm in diameter-sized CdSe nanocrystals embedded in a polymer. Advantageous polymers comprise poly(vinyl pyridine) and polystyrene. Other crystalline materials may comprise CdTe, InP, Si, InGaAs, and CdS.

Figure 1A:
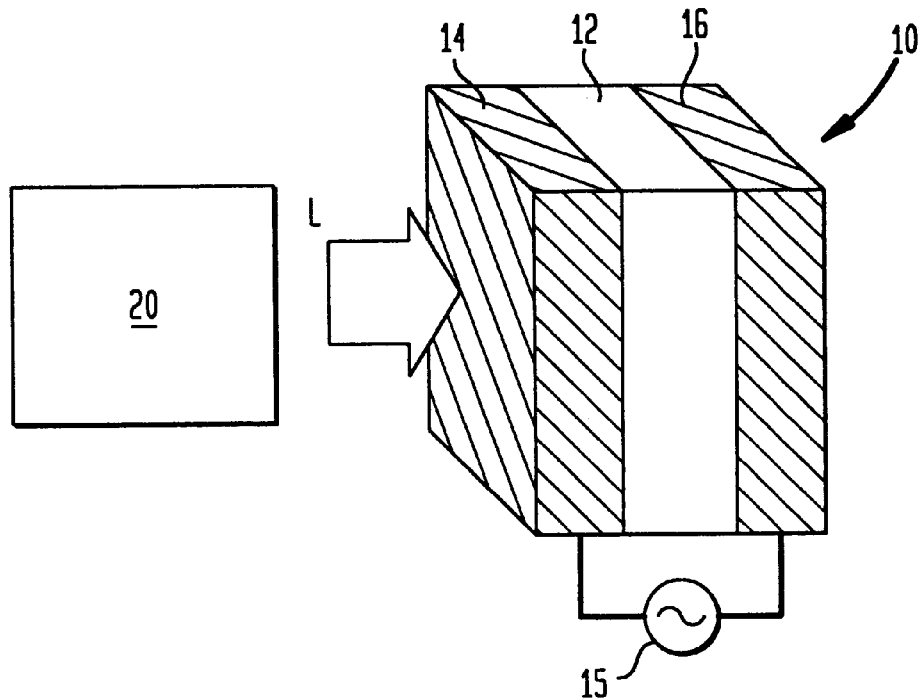
FIG. 1A is a cross-sectional view of a optical modulator in which the inventive crystalline material may be used.
Figure 1B:
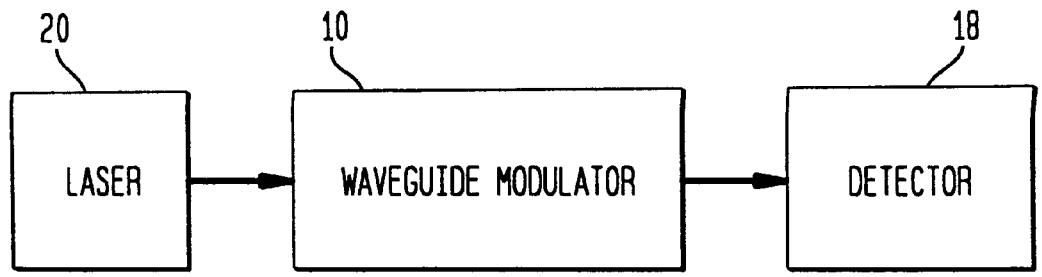
FIG. 1B is a schematic view of an optical communication system having an optical modulator in which the inventive crystalline material may be used.
Figure 4:
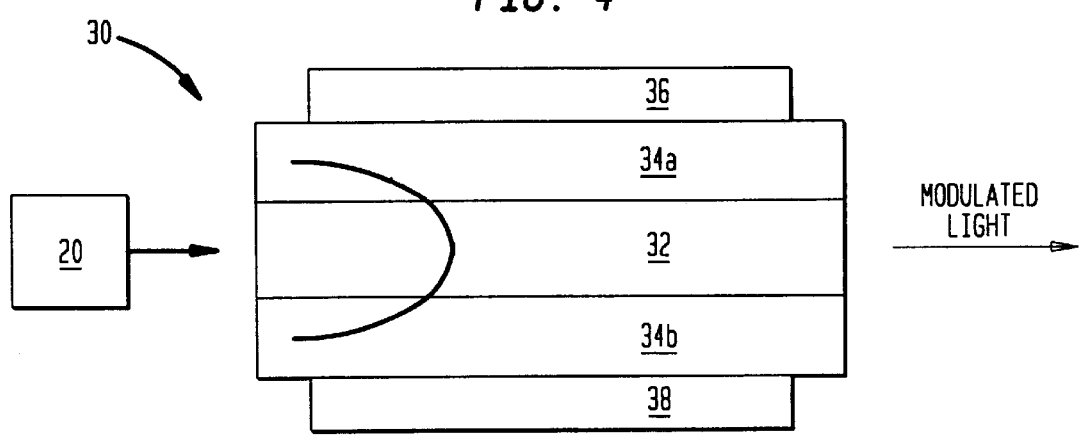
FIG. 4 is a cross-sectional view of a planar waveguide device in which the inventive optical crystalline material may be used.

The electroabsorption spectra of the nanocrystal composites have been measured over a range of electric fields. The changes in absorption spectra and refractive index with the applied field are qualitatively significant, and further, the anticipated differential absorption spectra as a function of crystal size may be calculated with the assumption that the nanocrystals comprise quantum dots or zero dimensional materials. Modulators and switches comprising these crystals can be used in conjunction with semiconductor lasers and Si-based photodetectors to create optical interconnection systems, as illustrated in FIGS. 1A, 1B, and 4. The discussion below is dividing into three parts. Part A addresses various features and characteristics of various embodiments of the inventive crystalline material; Part B describes an exemplary method of synthesis; and Part C discusses exemplary applications for the crystalline material.

A. Features and Characteristics of the Inventive Crystalline Material

Figure 2:
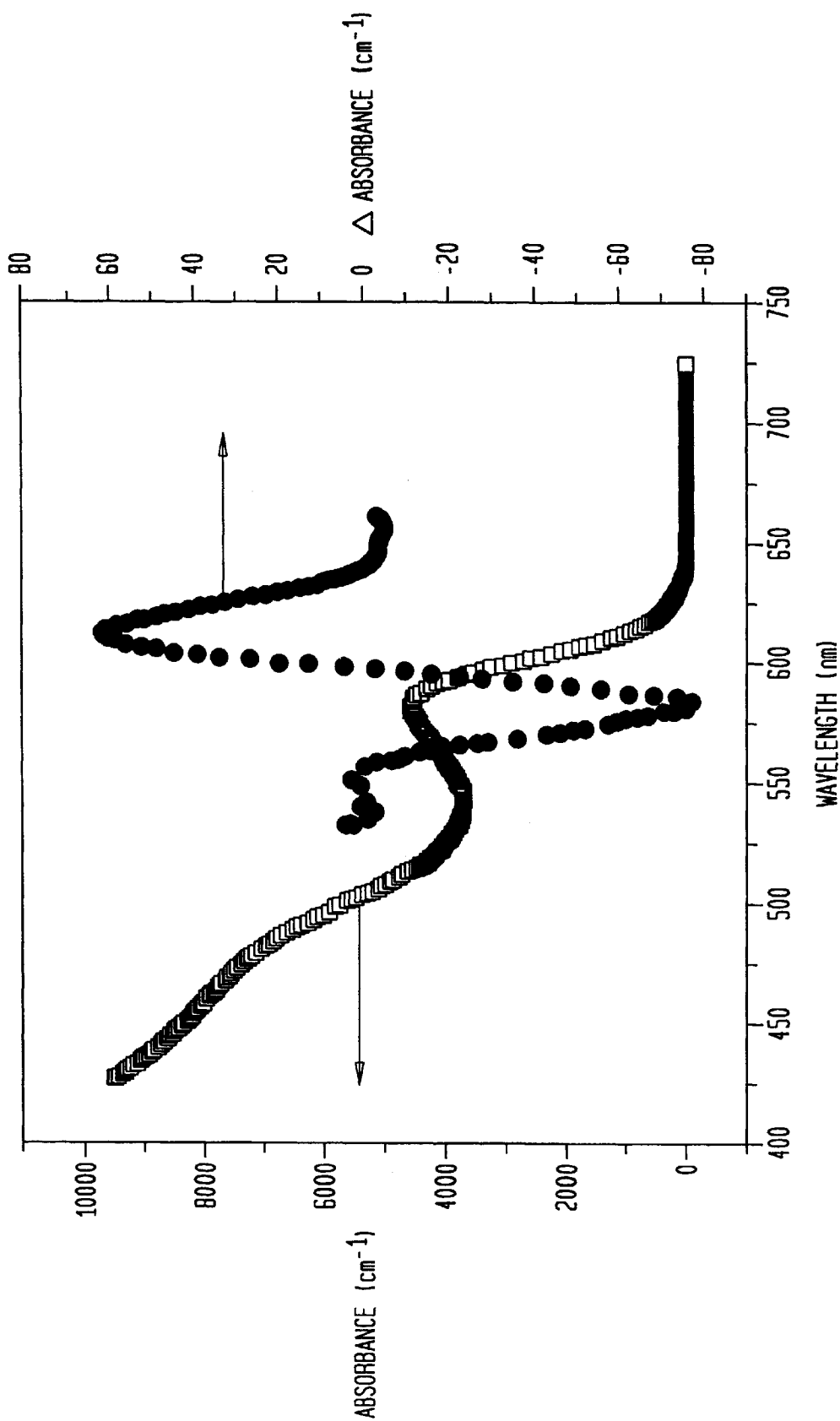
FIG. 2 is a graph illustrating the differential absorbance spectra of the inventive crystalline material involving a 10 percent crystal composite when a voltage of 100V is applied.
Figure 3:
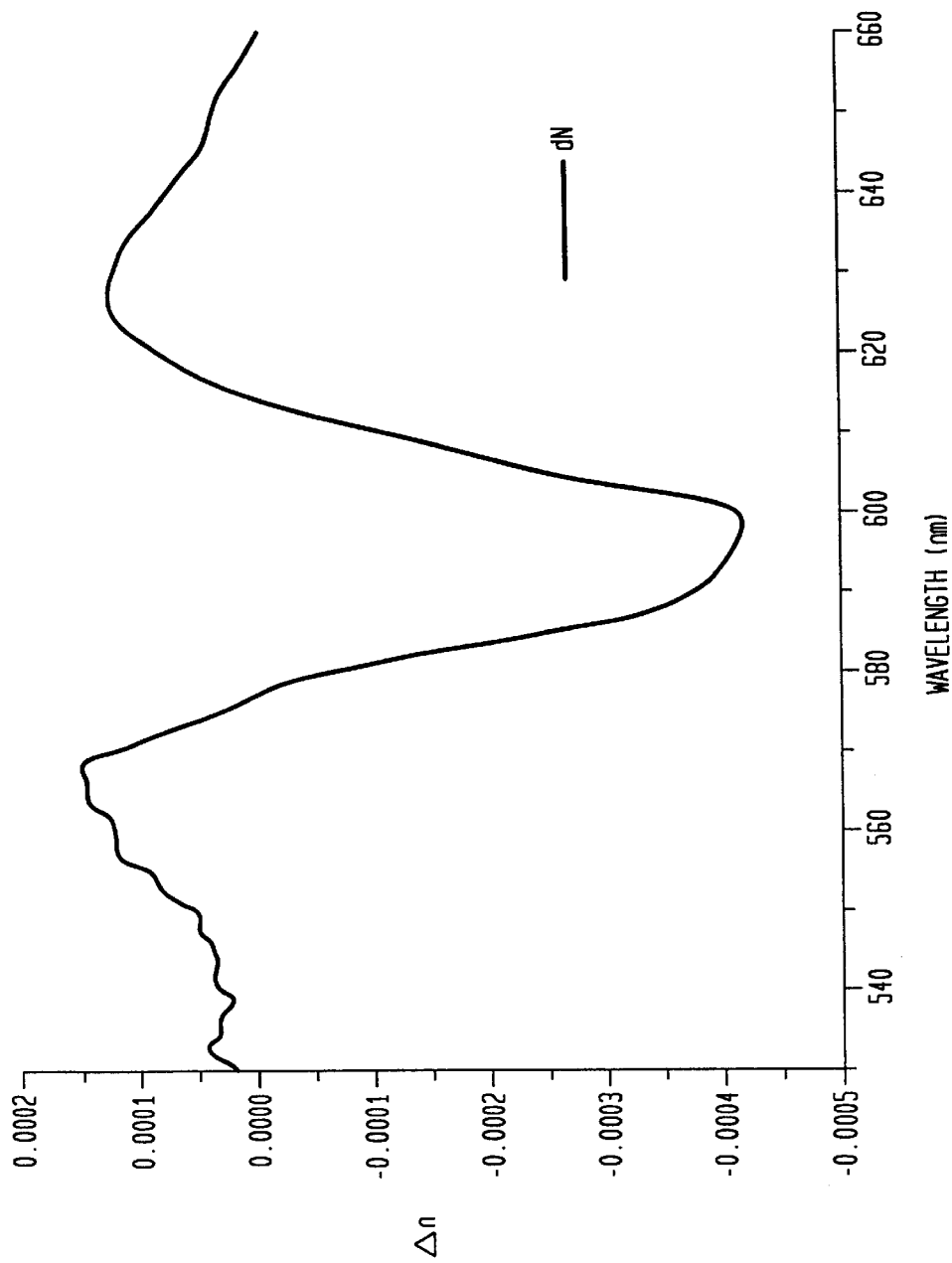
FIG. 3 is a graph showing the change in refractive index of the inventive crystalline material calculated from the data of FIG. 2.

FIGS. 2 and 3 show the differential absorbance spectra and differential refractive index, respectively, at room temperature for one embodiment of the inventive crystalline material. The data of FIG. 2 was experimentally obtained and the refractive index data of FIG. 3 was calculated from the absorbance data considering Kramers-Kronig relations, as is well known. The data of FIG. 2 reflects a crystalline material synthesized according to the Example of Part B, below, comprised of 4 nm in diameter sized CdSe nanocrystals dispersed in poly-4-vinylpyridine with a 10% by volume CdSe nanocrystal content in the polymer film, although the data was recorded with a 100% CdSe crystal which was then weighted to 10%. In any case, the crystalline material was sandwiched between two pieces of indium tin oxide (ITO) coated glass. The ITO-glass was substantially transparent with the conducting ITO functioning as electrodes, and a voltage of 100V was applied between the two ITO-glass electrodes. With this applied voltage the absorbance data was recorded for a broad range of wavelengths, as can be seen in FIG. 2, with the material exhibiting a differential absorbance ($\Delta A$) of about 50 cm$^{-1}$ at wavelengths of about 625 nm. The absorbance (A) was lowest at 50 cm$^{-1}$ at wavelengths at and above about 625 nm. As can be seen in FIG. 3, a differential refractive index ($\Delta n$) of about $10^{-1}$ was calculated for wavelengths of about 625 nm.

It can be observed from FIGS. 2 and 3 that the peak in refractive index change occurs at about 625 nm, whereas the peak in absorbance change occurs at about 610 nm. This red shift of the refractive index change peak is a favorable property because the absorbance—and hence absorption losses—are lower at longer wavelengths.

Although a peak differential absorbance ($\Delta A$) of about 50 cm$^{-1}$ at wavelengths of about 610 nm was recorded for the particular embodiment described above, with the inventive crystalline materials obtained pursuant to this invention, a differential absorbance ($\Delta A$) of about 5 cm$^{-1}$ to about 300 cm$^{-1}$ at wavelengths of about 600 nm to 650 nm could be achieved with the CdSe crystalline material. This would reflect a differential refractive index ($\Delta n$) of about $10^{-5}$ to about $10^{-3}$ for similar wavelengths. The value for $\Delta A$ and $\Delta n$ will be affected by the synthesis techniques, and the particular crystalline materials and particle sizes used. As the synthesis procedures are modified to increase the monodispersity of the particles, the values for $\gamma A$ and $\Delta n$ will likewise increase to provide a more effective electro-optical material.

Although the data for FIGS. 2 and 3 was obtained using a CdSe crystal and a poly-4-vinylpyridine host polymer, other materials may be used. Polyimides, acrylates, or polymers of photopolymerizable monomers may be used, for example. Other polymers that also may be used comprise polystyrene and fluorinated polymers including fluoroacrylates, fluoromethacrylates, fluorinated acrylamides, fluorinated urethanes, fluorinated epoxies, fluorinated vinyl esters, and co-polymers and mixtures of such polymers. Other III–V and II–VI semiconductor nanocrystals may comprise CdTe, CdSe, InP, and InGaAs. In addition, the use of Si (Group IV) nanocrystals is contemplated.

Also, the crystal size could be varied to obtain modulation at desired wavelengths. For example, GaAs-based laser technologies are well known, involving light beams of 630 to 830 nm. Crystalline materials may be fabricated for use in modulators operable at such wavelengths and combined with GaAs lasers. One may calculate the desired crystal size and anticipated absorption spectra characteristics for these wavelengths with the assumption that the particles comprise zero dimensional materials. Changes in absorption spectra may be determined when we consider the particles to comprise zero dimensional materials. When the size of individual semiconductor nanocrystals is less than twice the Bohr radius (=5.8 nm in diameter for CdSe), then the particles can be considered quantum dots or zero dimensional materials. Many optical properties of such nanocrystals change, sometimes drastically, with respect to bulk solids of the same material. The energy gap, E, is increased due to quantum confinement effects to:

$$E = E_g + h^2/2\mu[\pi/R]^2 - 1.786\, e^2/\epsilon R - 0.248\, R_y^* \quad (1),$$

where $E_g$ is the bandgap of the bulk solid, R is the cluster radius, $\mu$ is the reduced mass, e is the electronic charge, $\epsilon$ is the dielectric constant, and $R_y^*$ is the effective Rydberg constant, which is known in the field and described in C. Kittel, *INTRODUCTION TO SOLID STATE PHYSICS* (5th Ed., John Wiley & Sons). The bandgap is an indicator of, and may be used to determine, the absorption spectra, as is well known.

The density of states also changes from the parabolic density of states characteristic of bulk materials to, ideally, a set of discrete lines as in an atom. In real nanocrystals, however, the density of states is broadened due to differences in particle sizes, defects, and other imperfections.

The energy gap in Equation 1, above, which is the energy difference between the lowest lying electron and hole bound states, can be lowered by the application of an electric field. This effect is called the Stark effect in atoms and in zero-dimensional solids such as nanocrystals. In quantum well systems, it is referred to as the "Quantum-confined Stark Effect". The changes in absorption specta with field of the inventive crystalline material are consisted with what one would expect as a result of the Quantum-confined Stark Effect of zero-dimensional materials.

The decrease in bandgap with the application of an electric field means that the absorption spectrum also will change with the application of an electric field. The change in absorbance will result in a change in refractive index, since the two are related through the Kramers-Kronig relations, which are well known. Accordingly, changes in absorption spectra as a function of crystal size may be determined when we consider the particles to comprise zero dimensional materials.

B. Synthesis of Polymer-Dispersed Nanocrystals

The following is one example for synthesizing the inventive crystalline material, with it being understood that the invention is not limited to crystalline materials synthesized with the described method.

A crystalline material comprising CdSe crystals embedded in poly-4-vinylpyridine was fabricated with trioctylphosphine, trioctylphosphine oxide, dimethyl cadmium, elemental selenium, methanol, 1-butanol, and 4-vinylpyridine. These materials are commercially available. The 4-vinylpyridine was distilled immediately before use but the remaining materials were used without further purification.

Trioctylphosphine selenide was first prepared by directly combining trioctylphosphine and elemental selenium. Two reagent solutions were then prepared, the first being 0.5 ml dimethyl cadmium in 12.5 ml trioctylphosphine, and the second being 5 ml. of a solution comprising a 1:1 mole ratio of trioctylphosphine selenide to trioctylphosphine plus an additional 7.5 ml trioctylphosphine. These two solutions were combined in the barrel of a 50 ml syringe fitted with a hypodermic needle. In a separate vessel, 15 g trioctylphosphine oxide was degassed by heating under vacuum for about 15 minutes. After degassing, the temperature of the trioctylphosphine oxide was controlled to 300° C. While the trioctylphosphine oxide was vigorously stirred, the dimethyl cadmium and trioctylphosphine selenide solution was rapidly injected from the hypodermic needle. The mixture was maintained at about 200 to 250° C. for about 20 minutes and then allowed to cool to room temperature.

The nanocrystal material was then separated by precipitating the crystalline solids with addition of methanol and dissolving the solids with 1-butanol to remove residues. More specifically, the mixture obtained with the above process was first heated from room temperature to about 60° C., just above the melting point of the solvent, and methanol was quickly added. The methanol precipitated a crystalline residue which was collected and redissolved in 1-butanol. The butanol solution was then filtered, and the filtered solution was added to several volumes of methanol to reprecipitate the solid crystalline residue. The solids were redissolved in butanol and reprecipitated with methanol several times. This process yielded nanocrystals of CdSe and a slight residue of trioctylphosphine and trioctylphosphine oxide.

The nanocrystals were dispersed in poly-4-vinylpyridine as follows. Several milligrams of the nanocrystals were dissolved in 4vinylpyridine (distilled) and a small quantity of azobis(isobutyro)nitrile was added as a radical initiator, although other initiators could have been used, as is well known. The solution was heated to 70° C. for about 1 hour to initiate and carry out the polymerization. The resultant polymer-nanocrystal matrix that resulted was optically clear.

C. Application Examples

The following are examples for applications involving the inventive crystalline material, with it being understood that the invention is not limited to these particular applications.

Referring to FIG. 1A, the inventive crystalline optical material may be used to fabricate an optical display device, with the crystalline material comprising the crystal unit 2 disposed between the pair of electrodes 14, 16, and coupled to the power source 15. The electrodes 14, 16, may comprise indium-tin oxide (ITO), coated glass, as previously described. Also as previously described, the crystal size may be adjusted to demonstrate a peak differential absorbance for the wavelength of the particular laser light beam contemplated. The waveguide modulator may be coupled to a detector to comprise an optical communication system, as schematically illustrated in FIG. 1B.

Referring to FIG. 4, there is shown another application example, that is, the inventive crystalline material is used to fabricate a planar waveguide 30. The planar waveguide 30 comprises a core 32 disposed between two lower refractive index cladding layers 34a, 34b. The inventive crystalline material preferably constitutes the core, but it may be used for the cladding layers with a higher index material used for the core. Preferably, the core comprises a 1 $\mu$m in thickness layer of CdSe dispersed in polystyrene, and each of the cladding layers 34a, 34b, comprises a 1 $\mu$m in thickness layer of poly(vinyl alcohol). A pair of electrodes 36, 38 for applying an electric field are placed adjacent the two cladding layers. The electrodes 36, 38, may comprise any metal.

In the structure of FIG. 4, the applied electric field is dropped across both the core and cladding layers. The laser 20 is coupled to one end of the waveguide modulator adjacent the crystalline material, and the light is pumped directly into the crystalline material core or cladding to exit at the other end of the waveguide as a modulated light beam. The electric field is applied traverse to the path of the laser light beam. When this structure is used for the modulator, a longer device may be used to accomplish the light modulation (as compared with the optical display device of FIG. 1A), corresponding to a longer path for the light to travel through the crystalline material and a greater degree of modulation.

It is understood that the embodiments described herein are merely exemplary and that a person skilled in the art may make variations and modifications without departing from the spirit and scope of the invention. All such variations and modifications are intended to be included within the scope of the appended claims.

We claim:

1. An optical material for use in a waveguide modulator of a telecommunications system comprising semiconductor nanocrystals embedded in a polymer, wherein the optical material comprises the polymerization product of providing substantially monodisperse solid nano-crystalline particles selected from the group consisting of III–V, II–VI and IV semiconductor nanocrystals; dissolving the nano-crystals in a monomer solution or emulsion; and polymerizing the monomer with the nano-crystals dissolved therein to provide a solid-state, crystalline-polymeric optical material that will exhibit a differential absorbance ($\Delta A$) at room temperature of about 5 to 300 $cm^{-1}$ at wavelengths of about 600–650 nm with an applied voltage of about 0.5 to 100V.

2. The optical material of claim 1, wherein the semiconductor nanocrystals are selected from the group consisting CdSe, CdTe, InP, InGaAs, Si, and CdS crystals.

3. The optical material of claim 2, wherein the polymer is selected from the group consisting of (i) poly (vinylpyridine), polyimides, acrylates, polymers of photopolymerizable monomers, polystyrene, fluorinated polymers, fluoroacrylates, fluoromethacrylates, fluorinated acrylamides, fluorinated urethanes, fluorinated epoxies, and fluorinated vinyl esters, and (ii) co-polymers and mixtures thereof.

4. The optical material of claim 3, wherein the nanocrystals comprise approximately ten percent by weight of the crystalline-polymeric optical material.

5. The optical material of claim 1, wherein the nanocrystals are less than about 5.8 nm in diameter.

6. The optical material of claim 1, wherein at room temperature the crystalline-polymeric optical material will exhibit a differential refractive index ($\Delta n$) of about $10^{-5}$ to about $10^{-3}$ at wavelengths of about 600 to 650 nm with an applied voltage of about 0.5 to 100V.

7. An optical waveguide modulator comprising the optical material according to claim 1 sandwiched between a pair of electrodes.

8. The optical waveguide modulator of claim 7, comprising a core fabricated with the crystalline optical material, two cladding layers fabricated with an optical material having a higher index of refraction than the core, and a pair of electrodes, wherein the core is sandwiched between the two cladding layers and the two cladding layers are sandwiched between the pair of electrodes to provide a planar waveguide modulator wherein the applied electric field is dropped across both the core and the two cladding layers.

9. The modulator of claim 8, wherein the core comprises a 1 $\mu$m in thickness layer of CdSe embedded in polystyrene, and the two cladding layers each comprise a 1 $\mu$m in thickness layer of poly(vinyl alcohol).

10. An optical communication system comprising the modulator according to claim 7.

11. An optical communication system comprising the planar waveguide modulator according to claim 8.

12. An optical waveguide modulator for use in a telecommunications system comprising:

a crystalline optical material comprising semiconductor nanocrystals embedded in a polymer, wherein the optical material comprises the polymerization product of providing substantially monodisperse solid nano-crystalline particles selected from the group consisting of III–V, II–VI and IV semiconductor nanocrystals; dissolving the nano-crystals in a monomer solution or emulsion; and polymerizing the monomer with the nano-crystals dissolved therein to provide a solid-state, crystalline-polymeric optical material that will exhibit a peak in the refractive index change at about 610 nm and a peak in absorbance change ($\Delta \overline{A}$) at about 625 nm such that the optical material is adapted for exhibiting changes in optical properties upon an applied electric field to modify a beam of light propagated through the crystalline material; and a pair of electrodes for applying an electric field across the crystalline optical material.

13. The optical waveguide modulator of claim 12, wherein (a) the semiconductor nanocrystals are selected from the group consisting of CdSe, CdTe, InP, InGaAs, Si, and CdS crystals; and (b) the polymer is selected from the group consisting of (i) poly(vinylpyridine), polyimides, acrylates, polymers of photopolymerizable monomers, polystyrene, fluorinated polymers, fluoroacrylates, fluoromethacrylates, fluorinated acrylamides, fluorinated urethanes, fluorinated epoxies, and fluorinated vinyl esters, and (ii) co-polymers and mixtures thereof.

14. The optical waveguide modulator of claim 13, wherein at room temperature at wavelengths of about 600–650 nm and with an applied voltage of about 0.5 to 100V the crystalline-polymeric optical material will exhibit a differential absorbance ($\Delta A$) of about 5 to 300 $cm^{-1}$ and a differential refractive index ($\Delta n$) of about $10^{-5}$ to about $10^{-3}$.

* * * * *